United States Patent [19]
Dechen

[11] Patent Number: 5,897,081
[45] Date of Patent: Apr. 27, 1999

[54] METHOD OF REPLACING A TELEPHONE POLE AND SUSPENSION BRACKET USEABLE THEREFOR

[75] Inventor: Stephen J. Dechen, Ocean View, N.J.

[73] Assignee: Bell Atlantic Network Services, Inc., Arlington, Va.

[21] Appl. No.: 08/940,943

[22] Filed: Sep. 30, 1997

[51] Int. Cl.[6] .................................................. E21F 17/02
[52] U.S. Cl. .................. 248/61; 248/218.4; 248/225.11; 174/41
[58] Field of Search .......................... 248/61, 62, 218.4, 248/220.21, 220.22, 225.11

[56] References Cited

U.S. PATENT DOCUMENTS

| | | | |
|---|---|---|---|
| 1,675,602 | 7/1928 | Faust | 248/61 |
| 3,154,279 | 10/1964 | Fletcher et al. | 248/61 |
| 3,916,265 | 10/1975 | Friedman | 248/327 |
| 4,142,173 | 2/1979 | Gould et al. | 248/214 |
| 4,570,884 | 2/1986 | Armbruster | 248/218.4 |

*Primary Examiner*—Ramon O. Ramirez
*Assistant Examiner*—Robert Lipcsik
*Attorney, Agent, or Firm*—McDermott, Will & Emery

[57] ABSTRACT

A method of replacing an existing telephone pole having a terminal box mounted thereto is disclosed. The terminal box is dismounted from the existing telephone pole. The terminal box is then permanently suspended from at least one overhead cable. A new telephone pole is installed, typically at some distance from the existing telephone pole. The existing telephone pole is then removed. A rigid suspension bracket is usable in the method for suspending the terminal box from the overhead cable. The terminal box is suspended in approximately the same location as the terminal box was mounted to the existing telephone pole. This reduces the stress on a splice and eliminates the need to recondition the splice and replace the terminal box.

14 Claims, 6 Drawing Sheets

METHOD OF REPLACING A TELEPHONE POLE AND SUSPENSION BRACKET USEABLE THEREFOR

TECHNICAL FIELD

The present invention relates generally to a method of replacing a telephone pole and, more particularly, to a method of replacing a telephone pole having an aerial terminal distribution box mounted thereto and a suspension bracket useable therefor.

BACKGROUND ART

Telephone poles frequently need to be replaced for many reasons. For example, a car may hit the pole, the pole may crack, the pole may need to be moved, the pole may become infested, or a taller pole may be required because the electric company needs additional height. Thousands of poles are replaced each year. Technicians install the new pole before removing the old pole. The new pole must be placed near the old pole but at a point where the digging of the hole is not a problem. For example, the location of the pole must avoid interference with any underground wiring. As a result, the new pole will have a different positional relationship for mounting the wires and cables and other equipment. The new telephone pole is typically placed approximately four feet away from the existing telephone pole.

Once the new pole is in place, many devices attached to the existing pole have to be transferred to the new pole. This can create difficulties.

For example, the telephone company may have an aerial terminal distribution box hard-mounted to the telephone pole. The terminal distribution box provides terminals for connections to wire pairs within an overhead 200 pair telco cable through a permanent splice to the overhead cable. The permanent splice is typically located approximately six feet from the existing pole. A lead stub (typically 25 or 50 pair) extends from the terminal box and connects the terminal box to the splice. The permanent splice stub is typically sealed with lead sheathing which is subject to work hardening. Plastic sheathing may also be used which will crack if subjected to repeated bending. Consequently, repeated bending will cause cracks and leakage of the stub and/or the splice.

When the technicians install a new pole and remove an existing pole, the position of the splice relative to the pole changes. Often, the length of the existing lead stub is too short; therefore, the existing terminal box does not align with the new pole for mounting purposes. The terminal box and drop wires are too heavy to hang down from the stub connection and the splice.

The existing terminal box could be replaced and a new terminal box hard mounted to the new pole. The new terminal box would have a new lead stub of either 12 or 25 feet extending therefrom to the physical location of the splice. The existing splice has to be opened up, the existing lead stub removed and the new lead stub cut to length and connected to wires of the distribution cable within the splice.

Such a terminal box replacement is expensive, because a new terminal box is required, and it takes a technician six to eight hours to install a new terminal box and splice the stub lead into the existing splice. Service for subscribers relying on the terminal box is interrupted during the installation. Further, maintenance problems are created by having to resplice the new terminal box. Technicians make errors in splicing, and it is always possible that the splice may not be properly sealed and service outages may occur due to weather damage and the like.

Sometimes the terminal box and lead stub are removed and the splice is left open because a technician cannot immediately be sent out to repair the splice leaving the splice open to the environment. Because the splice has to be sealed to properly function, maintenance problems may result if the splice is left open during inclement weather.

The existing terminal box, stub and splice constitute perfectly good working loop plant equipment. Except for the pole replacement, there often is no need for service or replacement of these components. For all of the above reasons, telephone company technicians often do not cut in a new terminal box at the time of pole replacement. Instead, the terminal box is left in place, connected to the distribution cable through the stub and splice and providing connection to the subscribers drop wires.

In many such cases, during removal of the existing terminal box, the existing terminal box is secured to the overhead cable with tape, twine or cable ties. This situation may occur to prevent the splice from being left open during inclement weather. This is only a temporary solution because the twine or tape, when left exposed to sun and weather, quickly deteriorates, creating a hazardous condition should the terminal box become loose and fall.

When installed on a telephone pole, the terminal box is vertical, and the design of the terminal box seals the unit from precipitation. However, when tied to the cable, the terminal box assumes a horizontal position. This repositioning defeats the design of the terminal box seals. The terminal box leaks, and often the horizontal box collects water on the inside. Any moisture in the box can damage the circuitry, causing maintenance problems and/or service outages.

Further, such make-shift supports are disadvantageous in that the technician may need to untie the terminal box later, for example, to open the box and change connections to terminals located therein. Additionally, the terminal box will often be suspended from the overhead cable at a different position than it was mounted to the telephone pole. This difference in position causes stress, may work harden the lead sheathing in the splice and could cause service outages and later maintenance problems.

Twine may also be used to support the terminal box before or during removal of the terminal box. Because some of the terminal boxes are quite heavy and the technician is working off of a ladder or aerial bucket truck, a dangerous situation can sometimes occur should the technician become off balance due to the unsupported weight of the terminal box after the technician cuts the twine.

A need exists for a method of replacing a telephone pole that does not require immediate replacement of the stub or the opening of the existing splice. A need also exists for a method of replacing the telephone pole that does not require a new terminal box. Yet another need is for a method of replacing a telephone pole that does not cause a service outage. Other needs exist for maintaining the terminal box in the same location as the terminal box was mounted to the telephone pole to avoid stress on the splice. Still another need exists for a less expensive method of replacing a telephone pole that does not require significant time of a skilled technician.

DISCLOSURE OF THE INVENTION

It is, therefore, an object of the present invention to provide a method that substantially eliminates the above-mentioned problems and substantially fulfills the above-mentioned needs.

It is another object of the present invention to provide a bracket for mounting a terminal box on an overhead cable remote from the new telephone pole.

These and other objects of the present invention are achieved by a method of replacing an existing telephone pole having a terminal box mounted thereto. The method includes dismounting the terminal box from the existing telephone pole. The terminal box is then permanently suspended from at least one overhead cable. A new telephone pole is installed remote from the existing telephone pole. The existing telephone pole is then removed. The method of the present invention permits the terminal box to be suspended from the overhead cable instead of being mounted to the new telephone pole. Advantageously, this eliminates the need to open up a splice. The opening of the splice causes service outages, requires time of a skilled technician and may cause maintenance problems. Further, the method of the present invention eliminates the need for a new terminal box.

These and other objects of the present invention are achieved by a method of replacing an existing telephone pole having a terminal box mounted thereto. The method includes dismounting the terminal box from the existing telephone pole. The terminal box is then permanently suspended from at least one overhead cable, wherein the at least one overhead cable includes a strand and a telecommunication cable supported between telephone poles by the strand, and wherein the terminal box is suspended in approximately the same location relative to the telecommunications cable and in approximately the same orientation as before the terminal box was dismounted from the existing telephone pole. A new telephone pole is installed remote from the existing telephone pole. The existing telephone pole is then removed. Advantageously, the method of the present invention allows the terminal box to be suspended in the same location as the terminal box was mounted to the existing telephone pole to avoid stress on the splice.

These and other objects of the present invention are also achieved by providing a suspension bracket for suspending a terminal box from at least one overhead cable, the terminal box having been previously mounted to an existing telephone pole. The suspension bracket includes a mounting portion attachable to the terminal box. The suspension bracket also includes an engaging portion permanently fixable to the at least one overhead cable. The bracket has a predetermined length enabling the terminal box to be suspended from the at least one overhead cable in approximately the same location relative to the at least one overhead cable and in approximately the same orientation as before the terminal box was mounted from the existing telephone pole. By suspending the terminal box from the overhead cable, the terminal box can be reused, the splice does not have to be opened up, saving time and money.

The suspension bracket is preferably rigid to avoid movement of the terminal box relative to the overhead cable. Excessive movement may cause repeated bending of the splice which may cause damage to the splice due to work hardening of the lead sheathing.

Still other objects and advantages of the present invention will become readily apparent to those skilled in this art from the following detailed description wherein only the preferred embodiments of the invention are shown and described, simply by way of illustration of the best mode contemplated of carrying out the invention. As will be realized, the invention is capable of other and different embodiments, and several details are capable of modifications in various obvious respects, all without departing from the invention. Accordingly, the drawings and description are to be regarded as illustrative in nature, and not as restrictive.

BRIEF DESCRIPTION OF DRAWINGS

For a more complete understanding of the present invention and advantages thereof, reference is now made to the following description taken in conjunction with the accompanying drawings, in which like reference number indicate like features and wherein.

BEST MODE FOR CARRYING OUT THE INVENTION

Figure 1A:
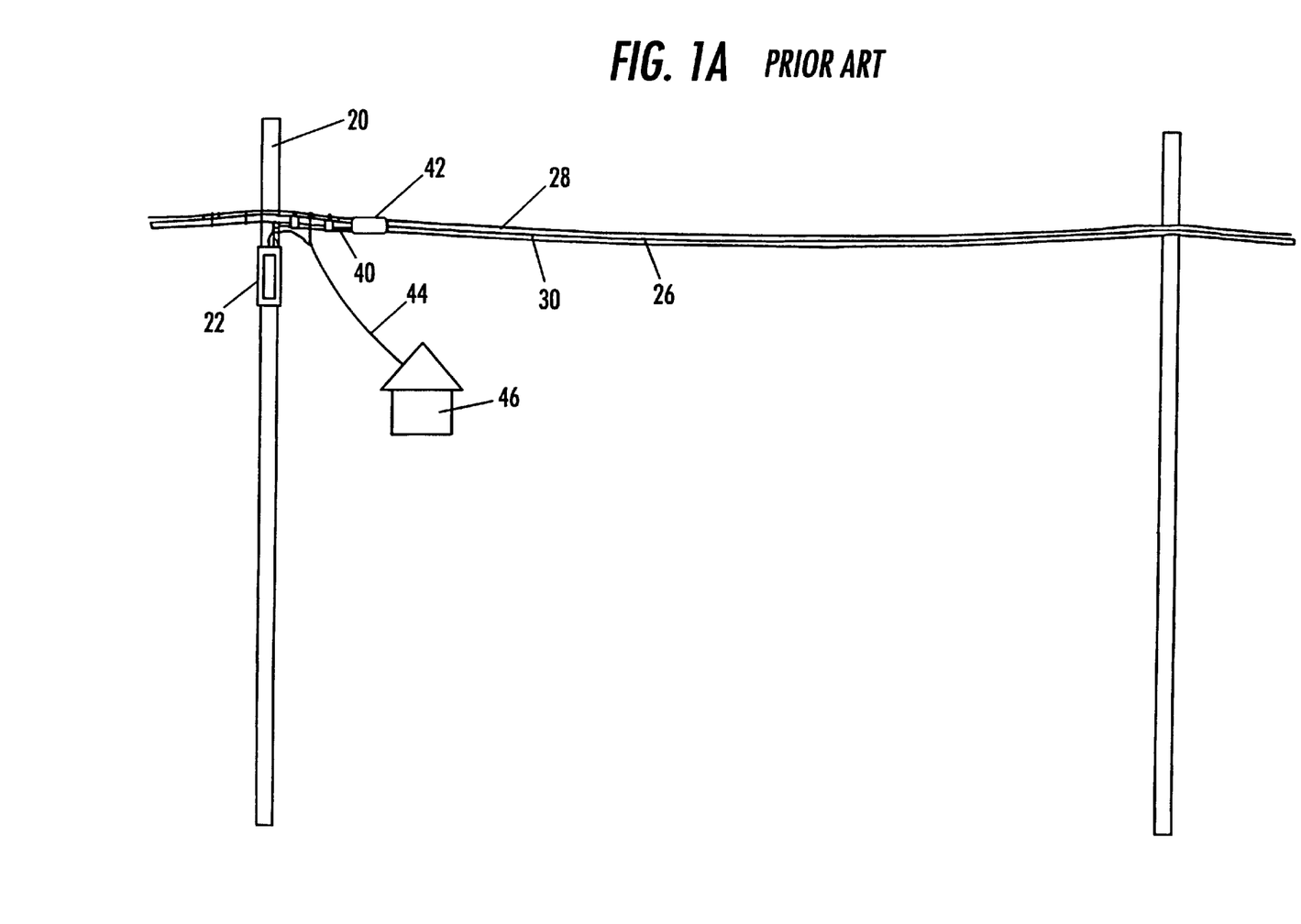
FIG. 1A is a schematic perspective view of a prior art existing telephone pole.
Figure 1B:
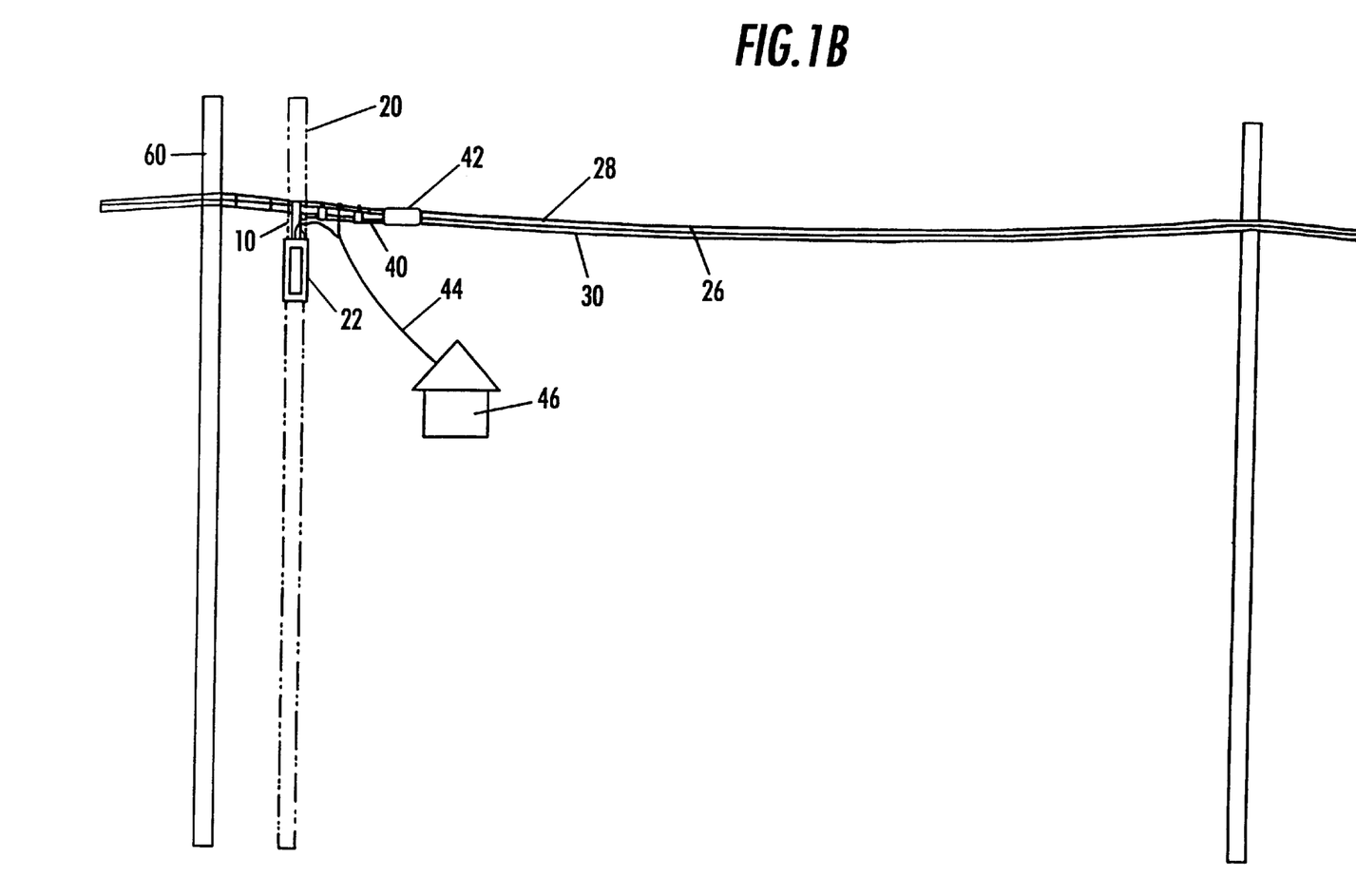
FIG. 1B is a schematic perspective view of the existing telephone pole in dashed lines and a new telephone pole placed remotely therefrom and an aerial terminal distribution box mounted to overhead cables.
Figure 2:
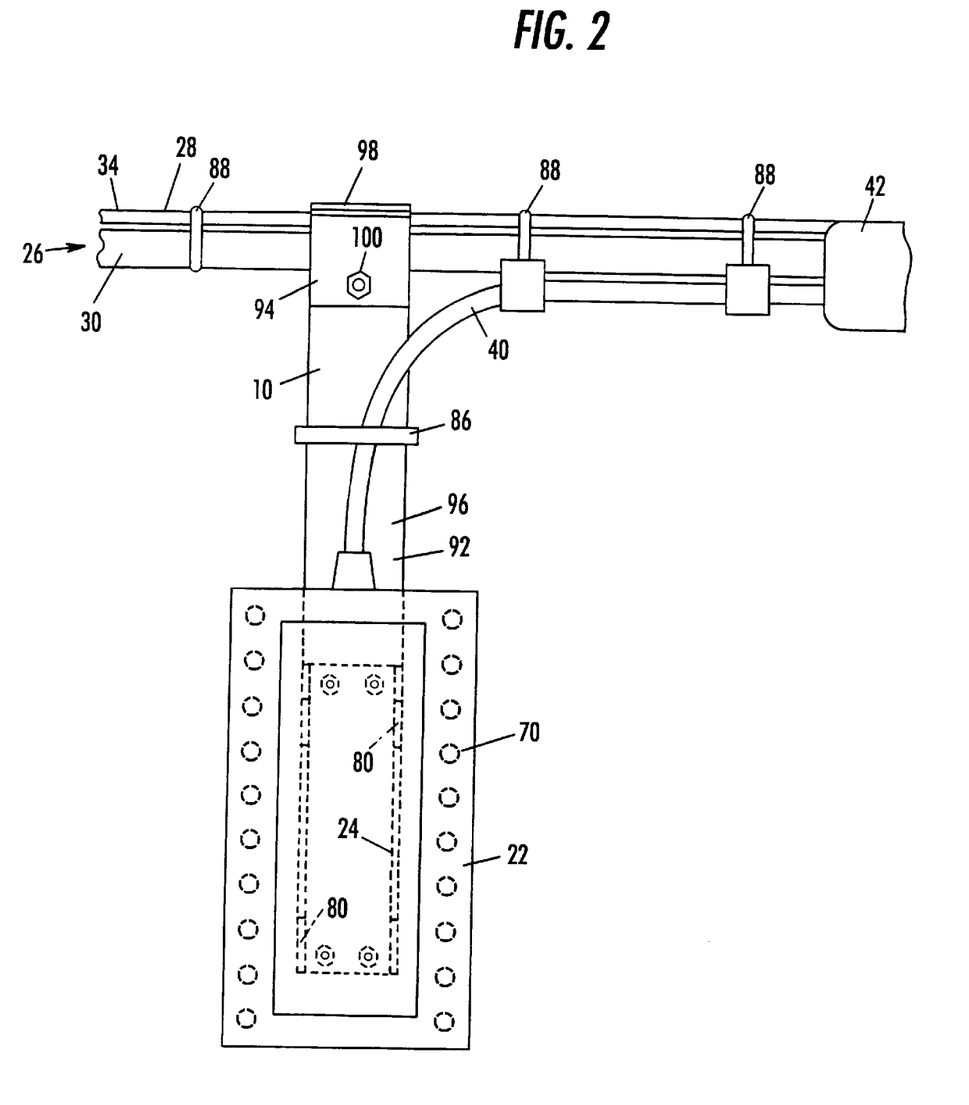
FIG. 2. is a front elevational view of an aerial terminal distribution box mounted to the bracket of the present invention.

Refer now to FIGS. 1B and 2, where a suspension bracket 10 is depicted which is constructed in accordance with the principles of the present invention. The replacement of an existing telephone pole with a new telephone pole is simplified using suspension bracket 10. Advantageously, a rigid bracket 10 suspends an aerial terminal distribution box from overhead cables, without the need to replace the terminal box or recondition the stub or splice.

Referring now to FIG. 1A, an existing pole 20 is depicted. For simplicity of explanation of the present invention, only the telco connections to the existing pole 20 are illustrated and described herein. It should be understood that other cables are frequently connected to the pole, such as cable television cables, local electric cables, municipal cables, city owned cables, railroad cables, and the present invention is applicable to the replacement of these cables and to any pole mounted terminals associated with these terminals.

An aerial terminal distribution box or terminal box 22 is fixedly mounted by bolting of a mounting bracket 24 (see FIGS. 2 and 3) directly to the surface of the existing pole 20 at an upper portion thereof. The terminal box 22 is typically provided with the standard mounting bracket 24. A self-supporting cable 26 is mounted above the terminal box 22 and connected to the existing pole 20 in a known manner. The self-supporting cable 26 is mounted about twenty feet above the ground and extends to other telephone poles as is conventional. The self-supporting cable 26 includes a strand 28 made of galvanized support wire and a communications cable 30. As used herein, strand means a support cable. The self-supporting cable 26 may be any type of suitable self-supporting cable, such as lashed cable. Lashed cable has a support strand wound around the outer diameter of the communications cable. It should be understood that the communications cable 30 as used herein can be any type of transmission cable, such as an electrical cable, cable for cable TV, and the like. As depicted in FIGS. 1A–5C, the communications cable 30 is a telco distribution cable and may have 200 wire pairs or any other number of pairs as is conventional in the telephone industry. A membrane 34 (FIG. 2) seals the strand 28 and the cable 30 and connects them together.

The terminal box 22 has a lead stub 40 extending from an upper end thereof. The stub 40 is approximately six feet in length and has the opposite end thereof connected to a number of the wire pairs of the communications cable 30, within a splice 42 which is conventional. The stub 40 may be a 25 wire pair stub or any other number as is conventional. If the stub 40 has 25 wire pairs, then the terminal box 22 would provide terminals for connection of a corresponding 25 pairs of drop wires 44 (FIGS. 1A and 1B) which would each extend into a residence 46 and provide telephone service thereto. The stub 40 has its 25 wire pairs spliced into the 200 wire pair cable 30 within splice case 42. The splice case 42 is sealed from the environment using any suitable construction, such as a lead sheath.

Refer now to FIG. 1B where is new telephone pole 60 is depicted (existing pole 20 is depicted in phantom with dashed lines). The self-supporting cable 26 is mounted to the new pole 60. The terminal box 22 is not mounted to the new pole 60. Instead, the terminal box 22 remains in approximately the position it was in when formerly mounted to the old pole 20. In FIG. 1B, a suspension bracket 10 suspends the terminal box 22 from the cable 26. Because the physical location of the terminal box 22 relative to the distribution cable 30 remains substantially the same, there is no need to change the stub connection to the terminal box 22 or open the splice case 42.

The process of replacing the existing telephone pole usually begins with setting a new telephone pole 60 in the ground approximately four feet from the existing pole 20. The new telephone pole 60 may be placed as far away as 100 feet from the existing pole 20. Replacement as used herein means that the new pole supports the existing cables but does not mean that the new pole is set in the same location as the existing pole. To support the existing cables, the new pole 60 is placed side-by-side with the existing pole. A technician then disconnects the self-supporting cable 26 from the pole 20 and reconnects the self-supporting cable 26 from the new pole 60 while the existing pole 20 remains standing. The cable 26 is tensioned in a known manner.

A technician then disconnects the terminal box 22 from the existing pole 20. As discussed above, depending upon the availability of a technician, it may have been necessary to hang the existing terminal box from the cable 26 using twine. It is possible that the existing pole 20 may be removed while the terminal box 22 is suspended with twine. In this situation, if the technician used a ladder, he would have to lean out from the new pole 60 to reach the existing terminal box 22 which is awkward and perhaps dangerous.

Instead, with the present invention, the technician first suspends the suspension bracket 10 from the cable 26 while the existing pole 20 still stands. Then the technician disconnects the terminal box 22 from the existing pole 20. Then the technician fastens the mounting bracket 24 of the terminal box 22 to the rigid suspension bracket 10. If the technician works from a ladder, because the existing pole 20 still stands while the terminal box 22 is being disconnected, the existing pole 20 supports the ladder making it easier for the technician to remove the terminal box 22 and remount the box on the bracket 10.

As depicted in FIG. 1B, the technician suspends the terminal box 22 from the strand 28 of the cable 26 using the suspension bracket 10. Suspension bracket 10 is sized so that the terminal box 22 hangs in approximately the same location relative to the cable 26 as when terminal box 22 was previously mounted to existing pole 20. The weight alone of terminal box 22, if left unsupported, could damage the stub or the splice 42. Advantageously, the bracket 10 is installed immediately after dismounting of the terminal box 22 from the old pole 20. Thus, the terminal box 22 is unsupported for a very brief period of time thereby preventing damage to splice 42 due to repeated bending and flexing of the lead sheath. Also advantageously, the terminal box 22 is maintained in a vertical orientation. Terminal box 22 is sealed in a manner to prevent water from entering only when in the vertical orientation. Also advantageously, the rigidity of the rigid suspension bracket 10 prevents excessive movement of the terminal box 22 relative to the telecommunications cable 30. Excessive movement may cause repeated bending of the splice 42 which may cause damage of the lead sheathing of the splice. Existing pole 20 can then be pulled.

Depending on the technicians preference, either the suspension bracket 10 can first be suspended from cable 26 and then terminal box 22 fastened to suspension bracket 10, or the terminal box 22 can first be fastened to suspension bracket 10 and then suspension bracket 10 can be suspended from cable 26.

Figure 3:
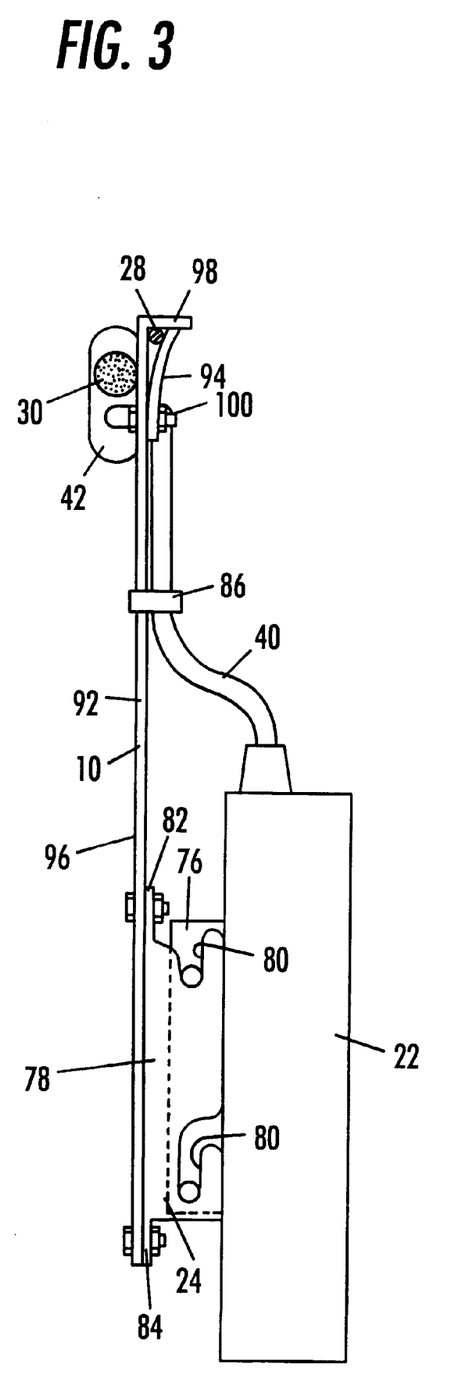
FIG. 3 is a side elevational view of the aerial terminal distribution box, bracket, and overhead cable of FIG. 2.

FIG. 2 provides a front view of the terminal box, the bracket and the various elements connected thereto. FIG. 3 provides a side view of these components.

In FIGS. 2 and 3, the terminal box 22, the suspension bracket 10, the mounting bracket 24, the cable 26 and the splice 42 are depicted in enlarged views corresponding to the illustration in FIG. 1B. In FIGS. 2 and 3, the terminal box 22 is depicted in an installed condition on cable 26.

Terminal box 22 includes a plurality of grommets 70 (shown in dashed lines) on a backside of terminal box 22 corresponding to the maximum number of drop wires 44 (not shown in the drawings) which may extend therethrough. The mounting bracket 24 includes a first member 76 fixed to the terminal box 22 and a second member 78. The second member is generally U-shaped and is fastened to the first member 76 by pins or bolts through two slots 80 formed in the extensions of the U of the member 78. Second member 78 has vertically disposed upper and lower flange sections 82 and 84 with four bolt-holes extending therethrough. The suspension bracket 10 has four holes or slots which will align with the bolt holes through the flanges 82, 42. The upper and lower flange sections 82, 84 which were previously fastened by wood screws to the existing pole 20, are connected instead to suspension bracket 10, for example, by nuts and bolts.

In this manner, the terminal box 22 and the mounting bracket 24 can be reused. Lead stub 40 is also reused and is maintained in approximately the same location as it was when the terminal box 22 was installed on the existing telephone pole 20. The stub 40 may be secured to the suspension bracket 10 with a metal strap 86 or a wire tie. Plastic ties 88 secure lead stub 40 to cable 26.

Although other materials may be used, in the preferred embodiment, the suspension bracket 10 is made of a galvanized steel. The bracket 10 is formed of a first elongated section 92 and a second flat plate member 94. In the illustrated implementation, the first elongated section 92 is approximately thirty inches long and has a vertical section 96 and a horizontal extending section 98. The horizontal and vertical orientations apply when terminal box 22 is in its installed position suspended from the strand 28 of the cable 26. A lower portion of the vertical section 92 is fastened to the upper and lower flanges 82, 84 respectively. Horizontal section 98 and vertical section 96 form an upside-down L-shape.

As previously installed on existing pole 20, the membrane 34 was cut, to separate the cable 30 and the strand 28 in a limited region near existing pole 20 to facilitate mounting the cable to that pole. The horizontal section 98 is inserted between the cable 28 and the strand 30, where separated. Flat plate member 94 is fastened to suspension bracket 10 at an upper portion thereof by a fastener 100. Flat plate member 94 is tightened by fastener 100 until brought into contact with the vertical section 96. Vertical section 96, horizontal section 98 and flat plate member 94 surround the strand 30 thereby securing the upper portion of the suspension bracket 10 to the support strand 30.

Figure 4A:
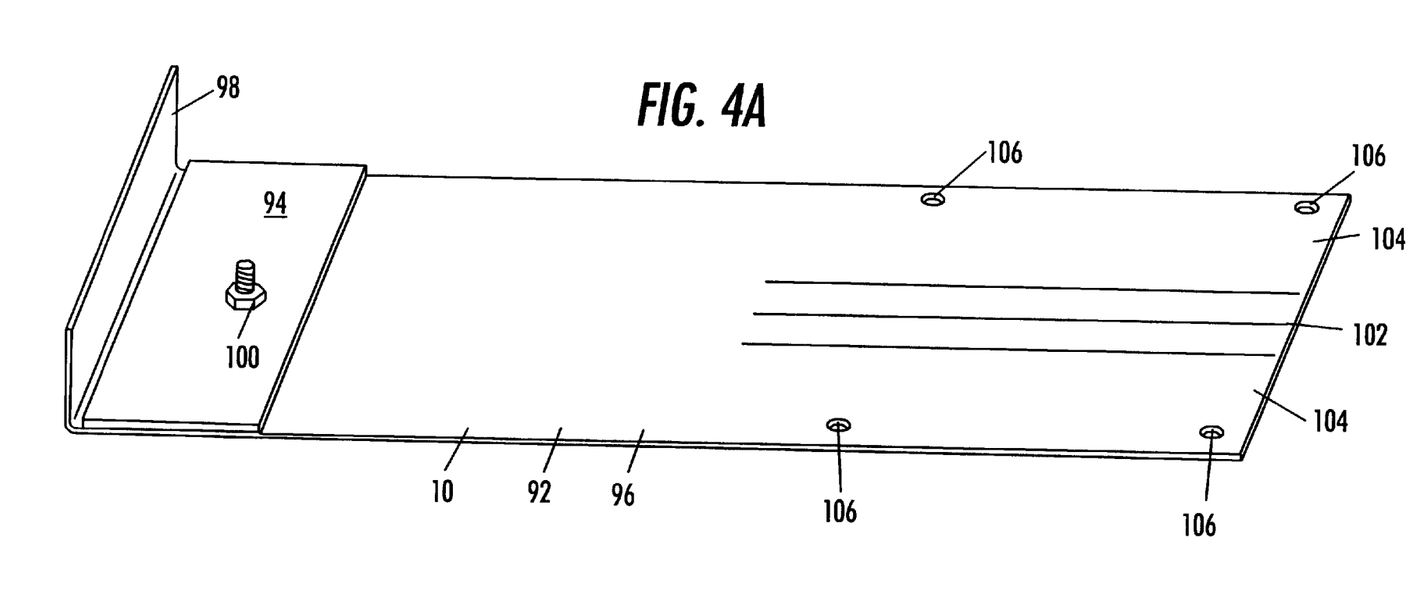
FIG. 4A is a perspective view of the bracket of the present invention.
Figure 4B:
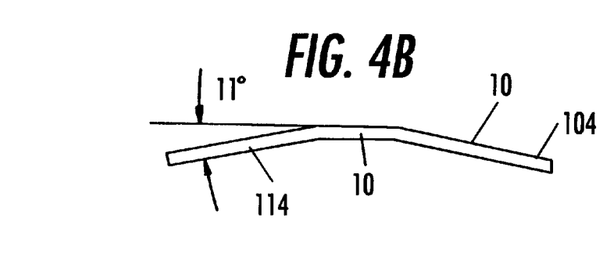
FIG. 4B, is an end view of the bracket of FIG. 4A.

In FIG. 4A, a perspective view of the suspension bracket 10 is depicted. One end of vertical section 96 has a central flat portion 102 and two bent portions 104. FIG. 4B is an end view of the bracket 10 illustrating the bent portions 104. The bracket 24 of the terminal box 22 is contoured to facilitate mounting thereof on a round telephone pole. The resulting contour of the bracket 10, produced by the flat 102 and the bent portions 104 matches the contour of the pole mounting bracket 24.

The bent portions 104 have a total of four spaced holes 106 and accommodate bolts or the like extending through the holes in the flanges 82, 84 of the mounting bracket 24. The hole arrangement preferably matches the holes on the existing mounting bracket 24. The hole arrangement can have a different arrangement for different terminals or brackets. Alternatively, to accommodate differences in locations of holes on different existing brackets 24, a universal suspension bracket 10, with several hole patterns or slots, could be used.

A ⅜" square hole (not shown) is formed in an opposite end of vertical section 96 for accommodating fastener 100. In the presently preferred embodiment, the fastener 100 is a carriage bolt with a nut. The square hole in vertical section 96 accommodates the square boss on the carriage bolt and prevents rotation of the carriage bolt when the nut is being tightened thereto.

It has been found that suspension bracket 10 according to FIGS. 2–4 and installed and as described herein is capable of being relatively permanently mounted to strand 28. As shown by the above discussion, terminal boxes and stubs that are functioning properly remain in service. There is no need to splice in a new stub. Also, the terminal box is permanently mounted in an orientation that maintains the effectiveness of its seals, thus limiting leakage and attendant performance problems.

Figure 5A:
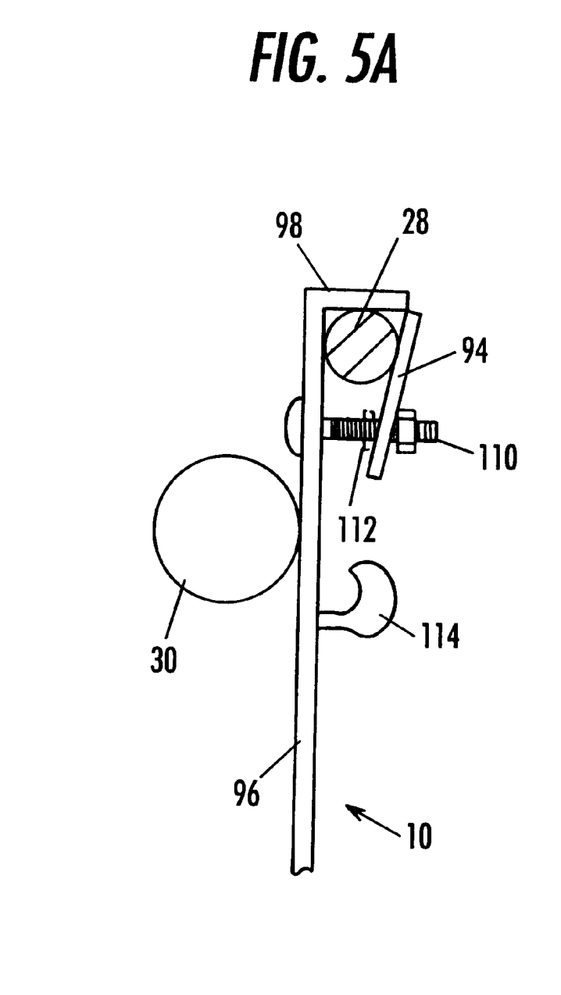
FIG. 5A–5C are various embodiments of the top portion of the bracket of FIG. 4.
Figure 5B:
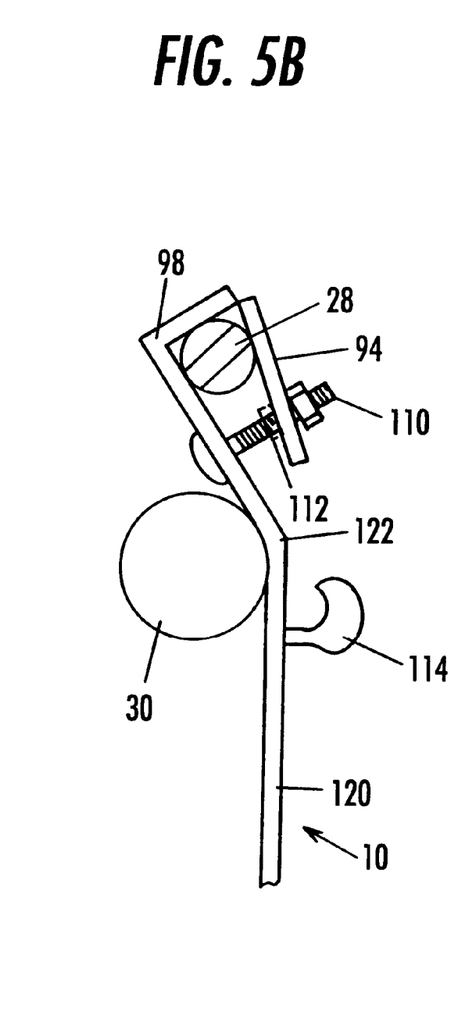
Figure 5C:
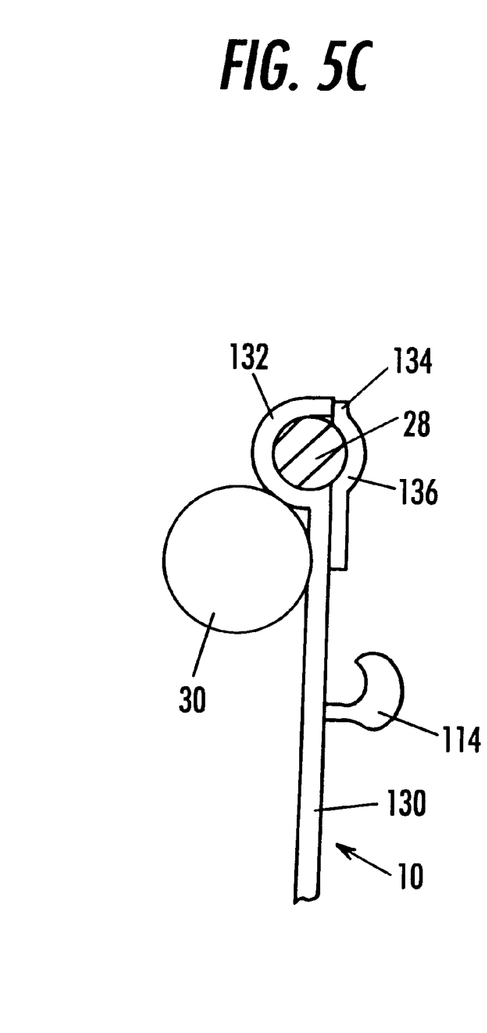

FIGS. 5A–5C depict three alternative arrangements of the upper portions of the suspension bracket. In FIG. 5A, the vertical section 96 and the plate 94, as previously described, are used in this alternative arrangement but a different fastener 110 is used. Here, the fastener 110 has a stop 112 which prevents flat plate member 94 from moving towards vertical section 96 as fastener 110 is being tightened. In this alternative arrangement, the strand 28 can be moved to a position on an opposite side of vertical section 96 from that shown. This means that the technician may install the bracket through the cut in the membrane 34 between the strand 28 and the communication cable 30, as shown. However, with this embodiment, it is also possible for the technician to choose to hang the bracket over the strand 28 and the cable 30, without inserting the bracket 10 through any cut in the membrane. As shown in FIG. 5A, a drop wire support 114 extends forwardly from vertical section 96 for supporting drop wires 44.

In FIG. 5B, a vertical section 120 is used which has a bend 122 at an upper portion thereof. Otherwise, the arrangement in FIG. 5B is identical to the arrangement in FIG. 5A. Bend 122 might help keep cable 30 in the position depicted in FIG. 5B.

In FIG. 5C, a vertical section 130 is used having a rounded portion 132 at an upper portion thereof. Rounded portion 132 has an inner diameter corresponding to the outer diameter of the strand 28. An enclosing portion 134 has an arcuate section 136 to surround a portion of strand 28 which extends outwardly beyond rounded portion 132. Enclosing portion 134 is connected to vertical section 130 in any suitable manner for example by a fastener (not shown).

Any of the brackets depicted in FIGS. 4, and 5A–5C can alternatively be made from several members and do not have to be solid as depicted but can have openings.

It should now be apparent that a method has been described which does not require a new terminal box to be installed when a telephone pole is replaced. Nor does telephone service have to be interrupted. Time and money are saved by not having to splice in a new lead stub or move drop wires from the old terminal box to the new terminal box. The present invention advantageously maintains the terminal box in the same location relative to the cable and splice in which the terminal box was mounted to the telephone pole, to avoid stress on the stub or the splice. Further, the present invention provides a less expensive method of replacing a telephone pole that does not require significant time of a skilled technician or installation of a new terminal box or a new stub.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of replacing an existing telephone pole having a terminal box mounted thereto, comprising the steps of:

dismounting the terminal box from the existing telephone pole;

permanently suspending the terminal box from at least one overhead cable, wherein the at least one overhead cable includes a strand and a telecommunication cable supported between telephone poles by the strand, and wherein the terminal box is suspended in approximately the same location relative to the telecommunication cable and in approximately the same orientation as before the terminal box was dismounted from the existing telephone pole;

installing a new telephone pole remote from the existing telephone pole; and removing the existing telephone pole.

2. A method of replacing an existing telephone pole having a terminal box mounted thereto, comprising the steps of:

dismounting the terminal box from the existing telephone pole;

permanently suspending the terminal box from at least one overhead cable;

installing a new telephone pole remote from the existing telephone pole; and removing the existing telephone pole.

3. The method as recited in claim 2, wherein said step of installing comprises locating the new telephone pole approximately four feet away from the existing telephone pole.

4. The method as recited in claim 2, wherein said suspending step includes the steps of:

fixing a suspension bracket to the terminal box; and engaging a portion of the suspension bracket with the at least one cable.

5. The method as recited in claim 4, wherein said suspension bracket comprises an L-shaped portion and said engaging step includes the steps of:

positioning inner sides of said L-shaped portion to embrace a portion of the at least one cable; and fastening a plate to the suspension bracket to fix the portion of the cable between said L-shaped portion and said plate.

6. The method as recited in claim 2, wherein said installing step is performed before said suspending step.

7. The method as recited in claim 2, wherein the at least one overhead cable is a strand.

8. The method as recited in claim 2, wherein the at least one overhead cable includes a strand and a telecommunication cable supported between telephone poles by the strand, and step of suspending comprises fixing the terminal box to the strand.

9. The method as recited in claim 4, wherein the terminal box includes a mounting bracket, and the step of fixing comprises attaching the mounting bracket to the suspension bracket.

10. The method as recited in claim 2, wherein said step of dismounting further comprises the steps of:

removing said cable from the existing telephone pole; and tensioning the at least one overhead cable.

11. The method as recited in claim 2, wherein said step of suspending comprises locating the terminal box in approximately the same vicinity as the originally mounted location of the terminal box.

12. A suspension assembly for suspending a terminal box from an overhead cable to replace a previous mounting of the terminal box in the same vicinity on an existing telephone pole, said suspension assembly comprising:

a suspension bracket having a mounting portion for coupling with the terminal box and an engaging portion permanently fixable to the cable, said suspension bracket having a predetermined length whereby the terminal box may be suspended from the overhead cable in approximately the same location and in approximately the same orientation with respect to the cable as before the terminal box was dismounted from the existing telephone pole;

a first mounting bracket fastened to the terminal box; and a second mounting bracket configured for attachment to the existing telephone pole when the terminal box was mounted thereto and for attachment to the suspension bracket when the terminal box is subsequently suspended from the cable; and wherein the first and second mounting brackets comprise corresponding aligned openings for coupling the first and second mounting brackets together.

13. The assembly as recited in claim 12, wherein said engaging portion is L-shaped and said bracket further comprises a plate for affixing said cable to said engaging portion.

14. The assembly as recited in claim 12, wherein said cable comprises a telecommunications cable wired to said terminal box and a strand, and said suspension bracket is fixable to said strand.

* * * * *